(12) United States Patent
Pratt et al.

(10) Patent No.: US 6,241,840 B1
(45) Date of Patent: Jun. 5, 2001

(54) THERMOPLASTIC LINER PIPE FOR POTABLE WATER

(75) Inventors: Charles F. Pratt, Tervuren; Michael H. Thaman, Uccle; Claude Renaud, Herve, all of (BE); Gerald G. Greaves; Kevin J. Spoo, both of Granville, OH (US)

(73) Assignee: Flowtite Technology AS, Sandeford (NO)

( * ) Notice: Subject to any disclaimer, the term of this patent is extended or adjusted under 35 U.S.C. 154(b) by 0 days.

(21) Appl. No.: 09/070,878

(22) Filed: May 1, 1998

(51) Int. Cl.[7] .............................. B65H 81/06; B65H 81/08
(52) U.S. Cl. ..................... 156/172; 156/173; 156/191; 156/195; 156/244.13
(58) Field of Search ..................................... 156/171, 172, 156/173, 195, 244.13, 191, 276; 428/34.7, 36.1, 36.2, 36.3, 36.4, 36.91; 138/144, 145; 427/181, 183, 196

(56) References Cited

U.S. PATENT DOCUMENTS

| | | | |
|---|---|---|---|
| 3,336,176 | * | 8/1967 | Medney ............................ 156/173 |
| 3,769,127 | * | 10/1973 | Goldsworthy et al. ............. 156/173 |
| 4,010,054 | | 3/1977 | Bradt . |
| 4,011,354 | | 3/1977 | Drostholm et al. . |
| 4,078,957 | * | 3/1978 | Bradt ............................... 156/173 |
| 4,139,025 | | 2/1979 | Carlstrom . |
| 4,233,101 | | 11/1980 | Scragg et al. . |
| 4,357,962 | | 11/1982 | Shaw et al. . |
| 4,459,168 | * | 7/1984 | Anselm ............................ 156/143 |
| 4,465,449 | | 8/1984 | Hornbeck . |
| 4,579,900 | | 4/1986 | Chatterjee et al. . |
| 4,842,794 | * | 6/1989 | Hovis ............................... 264/145 |
| 5,024,712 | * | 6/1991 | Lecourt et al. ...................... 156/190 |
| 5,026,451 | | 6/1991 | Trzecieski et al. . |
| 5,225,021 | * | 7/1993 | Lona ................................. 156/190 |
| 5,317,059 | * | 5/1994 | Chundury et al. ................... 525/66 |
| 5,362,528 | | 11/1994 | Carlstrom . |
| 5,469,891 | | 11/1995 | Lund et al. . |
| 5,500,165 | | 3/1996 | Cargnelutti . |
| 5,629,062 | | 5/1997 | Ejiri et al. . |
| 5,643,526 | | 7/1997 | Hert et al. . |
| 5,948,505 | * | 9/1999 | Puppin ............................... 428/121 |
| 5,973,019 | * | 10/1999 | Spoo .................................. 522/24 |

FOREIGN PATENT DOCUMENTS

| | | |
|---|---|---|
| 0291639A | 11/1988 | (EP) . |
| 0442457A | 8/1991 | (EP) . |
| 1178685 | 1/1970 | (GB) . |
| 57-082022 | * 5/1982 | (JP) . |

OTHER PUBLICATIONS

Database WPI, Section Ch, Week 8617, Derwent Publications Ltd., London, GB; Class A23, AN 86–110391; XP002108378 & JP 61 053322 A (Hitachi Chem Co Ltd), Mar. 17, 1986.

PCT Search Report dated Jul. 15, 1999.

* cited by examiner

*Primary Examiner*—Michael W. Ball
*Assistant Examiner*—Barbara J. Musser
(74) *Attorney, Agent, or Firm*—Inger H. Eckert; James J. Dottavio

(57) ABSTRACT

An invention is disclosed which relates to a process for producing a glass reinforced potable water pressure pipe having an ultra thin inner layer of thermoplastic resin that is made via a continuous mandrel concept and which is ideally suited for use with potable water.

41 Claims, 2 Drawing Sheets

THERMOPLASTIC LINER PIPE FOR POTABLE WATER

TECHNICAL FIELD AND INDUSTRIAL APPLICABILITY OF THE INVENTION

The present invention relates to the field of potable water pipes. More particularly, the invention relates to a process for producing a glass reinforced potable water pressure pipe having an ultra thin inner layer of thermoplastic resin that is made via a continuous mandrel concept. The concept of a truly continuous process avoids the multi-step process costs and has the added benefit of allowing the use of polyphenylene polymer (PPE) based formulations or thermoplastic copolymers and multi-layered films. The use of various thermoplastic formulations obviates the need for polyester release films and surface mat materials, resulting in increased efficiencies and reduced costs. The piping produced by the method of the invention is fully compatible with potable water, and extremely water resistant yet with little to no organic contamination of the water by the lining itself.

BACKGROUND OF THE INVENTION

The use of thermoplastic lining of laminate plastics for protecting the laminates from degradation by chemicals and water is well known in the art. In particular, laminates such as glass reinforced polyester thermoset plastic have had acceptance in the manufacturing of pipes and piping systems for carrying water. Glass-reinforced polyester (GRP) thermoset pipe has been used widely in the making of pipes and storage vessels for liquids, including water, since the early 1970's. GRP pipes exhibit the characteristics of low thermal conductivity, resistance to corrosion and ease of installation; however, prolonged contact with water, especially heated water, can reduce the properties of GRP piping over a long period of time.

GRP laminate has been shown to become permeated by water after prolonged exposure to water through the absorption of the water into the plastics matrix, followed by diffusion of the water through the matrix of the resin. The water in contact with the resin acts as a lubricating agent and softens the resin matrix. Swelling of the plastic materials also occurs which is a function of the composition of the laminate. The small bubbles and occlusions present in the resin matrix become filled with the water causing local stresses that eventually produce micro-cracks in the laminate.

In order to minimize the corrosion of the laminate, impermeable liners have been used to slow the attack of water or other chemicals on the laminate. Thermoplastic liners are known in the art to have the following characteristics: (1) low water permeability; (2) high temperature resistance; (3) flexibility with age; (4) chemically inert to water; and (5) a good cost performance ratio. Even so, it has been reported that at elevated temperatures these thermoplastics are still somewhat permeable to water. If the permeability of the laminate pipe shell is less than the liner, then water will eventually accumulate by diffusion at the interface attacking the liner-laminate bond which will cause pocketing and blistering. If, on the other hand, the laminate is more permeable than the liner, the water will eventually diffuse completely through the pipe and the pipe will remain intact. Therefore, a liner needs to be constructed that is highly impermeable to water, yet is thick enough so that the diffusion rate of water is equivalent or lower to that of the laminate. C. Renaud, Influence of liner permeability on mechanical properties of GRP laminates after hot water exposure, *I.R.P.I.* pp.10–13, (January/February 1983). Furthermore, if the thermoplastic layer is of significant thickness, it will develop shear stresses between the liner and the shell which will exceed the bond strength and could cause the liner to pocket or blister.

There are examples of GRP laminates with thermoplastic liners in the prior art. For example, German patent DE3342386 A1 (1985) describes a tank constructed of multi-layer polyester/modified PPO for drinking water storage. At present, construction of GRP piping with thermoplastic liners involves a multi-step process where a thermoplastic resin is bonded to a pre-formed plastic shell using an adhesion promoting layer or some variation of this. Some examples of this technique are: U.S. Pat. No. 5,629,062 to Ejiri et al, "Fiber Reinforced Plastic Pipe and Process for Producing the Same", disclosing a fiber reinforced plastic pipe having an inner layer formed by winding a prepreg sheet containing a thermoset resin around a mandrel. U.S. Pat. No. 5,643,526, to Hert, et al., "Process for Preparing a Composite Tubular Article Consisting of a Vulcanized Elastomer Used in Combination with a Thermoplastic Containing Polyamide Blocks Especially Petro Pipe", describes a process for preparing a composite tubular article consisting of an inner layer of thermoplastic elastomer. Brandt, U.S. Pat. No. 4,010,054, "Thermoplastic Filament Winding Process", relates to a method of forming pipe by winding thermoplastic filaments into a rotating mandrel; and U.S. Pat. No. 4,357,962 to Shaw, et al, "Method and Apparatus for Producing Tubular Article", describes the formation of a composite pipe having a tubular liner formed of thermoplastic material with an outer layer of glass fiber fabric. An additional outer layer of fiberglass and resin is applied afterwards.

The present invention provides a process of producing a GRP pipe with a thermoplastic liner in a truly continuous process and without the use of an adhesion-promoting layer which is fully compatible with potable water. There are examples of disclosures of continuously formed thermoplastic lined thermoset resin pipe manufactured using a continuous mandrel; unlike the present invention, however, the methods disclosed in previous patents differ from the present invention in a number of ways. For example, patents such as U.S. Pat. No. 3,979,250 to Drostholm, "Apparatus For Making Continuous Lengths Of Resin Tubes", U.S. Pat. No. 4,011,354 and its continuation U.S. Pat. No. 4,081,302, use an intermediate bonding layer consisting of either materials pressed into the soft formed inner thermoplastic lining or grooves or other impressions made into the lining to provide good adherence to the thermoset resin shell. As a result, the pipes have not been useful on a prolonged basis when continuously exposed to water. There is a need for a pipe having an ultra-thin thermoplastic lining to secure an enhanced resistance to water with a higher safety margin against any possible contamination of potable water, at an affordable cost, making the pipe fully compatible for use with potable water applications. This need is met by the present invention.

SUMMARY OF THE INVENTION

A continuously formed GRP pipe designed for potable water delivery, where the inner surface layer is composed of a thermoplastic resin especially suited for extended contact with potable water and water systems due to its having favorable properties such as minimal extraction of organic substrates and components from the plastic. The thermoplastic layer can be applied by a melt-extrusion or film-wrap-and-weld-process.

The invention offers several advantages over the prior art piping. Specifically, in one embodiment, the invention discloses a process whereby the pipe may be manufactured in a continuous manner, using a continuous mandrel, thereby avoiding a costly multi-step process. Further, the invention provides a means of applying the thermoplastic inner layer of the pipe rapidly and substantially evenly at a thickness of under 1 mm while maintaining high efficiency. The disclosed process also allows for the use of PPE-based formulations, or preferably, coextruded multi-layer films, enabling the manufactured pipe to combine excellent hydrolytic/water contact properties important for potable water performance, with excellent material compatibility with polyester resins. Finally, the high performance thermoplastic inner layer of the pipe allows significant redesign of pipe shell laminates for improved cost/performance ratios.

As previously mentioned, a preferred embodiment of the present invention uses a thermoplastic inner layer of the pipe constructed with multi-layered films which can be coextruded and wrapped onto the pipe mandrel or made separately and wound onto the mandrel. In either case the resulting inner linings are only a few hundredths of a millimeter in thickness. The copolymers used in the films can be chosen so that the water side is highly water resistant while the pipe shell side has greater bonding ability with the thermoset resin pipe shell.

The compatibility with polyester resins of the pipe provides a number of advantages over the prior art. For example, it minimizes or eliminates interfacial adhesion problems between the inner and outer layers of the pipe, and also obviates the need for polyester release films and/or possibly surface mat materials in the manufacturing process lowering the overall cost of production.

In a preferred embodiment, the pipe shell is cured using peroxide blend compositions relates to a composition comprising acetylacetone peroxide in an amount of from about 30 to about 35 percent and a high temperature peroxide, wherein the peroxide blend composition is effective in obtaining a high completion of cure of the resin of the outer pipe shell having a low residual styrene content. The low residual styrene content of the resin cured with the peroxide blend composition of the present invention is less than 1%. In another embodiment, the high temperature peroxide is t-butyl peroxybenzoate, and is present in an amount of from about 5 to about 10 percent of the total composition. In yet another preferred embodiment of the invention, the pipe shell is cured using acetylacetone peroxide in an amount of 30% percent of the total composition and t-butyl peroxybenzoate is present in an amount of 10%. Thus, the preferred ratio of acetylene peroxide to t-butyl peroxybenzoate is 30:10. The preferred cure has a rapid onset and is completed below 150° C., with a good cure in the range of 100–140° C.

The peroxide blend composition may also contain stabilizers such as diacetone alcohol or n-methyl-2-pyrrolidone and other diluents. In another embodiment of the invention, the curing process is carried out in the presence of the thermoplastic lined composition.

DETAILED DESCRIPTION AND PREFERRED EMBODIMENTS OF THE INVENTION

Figure 1:
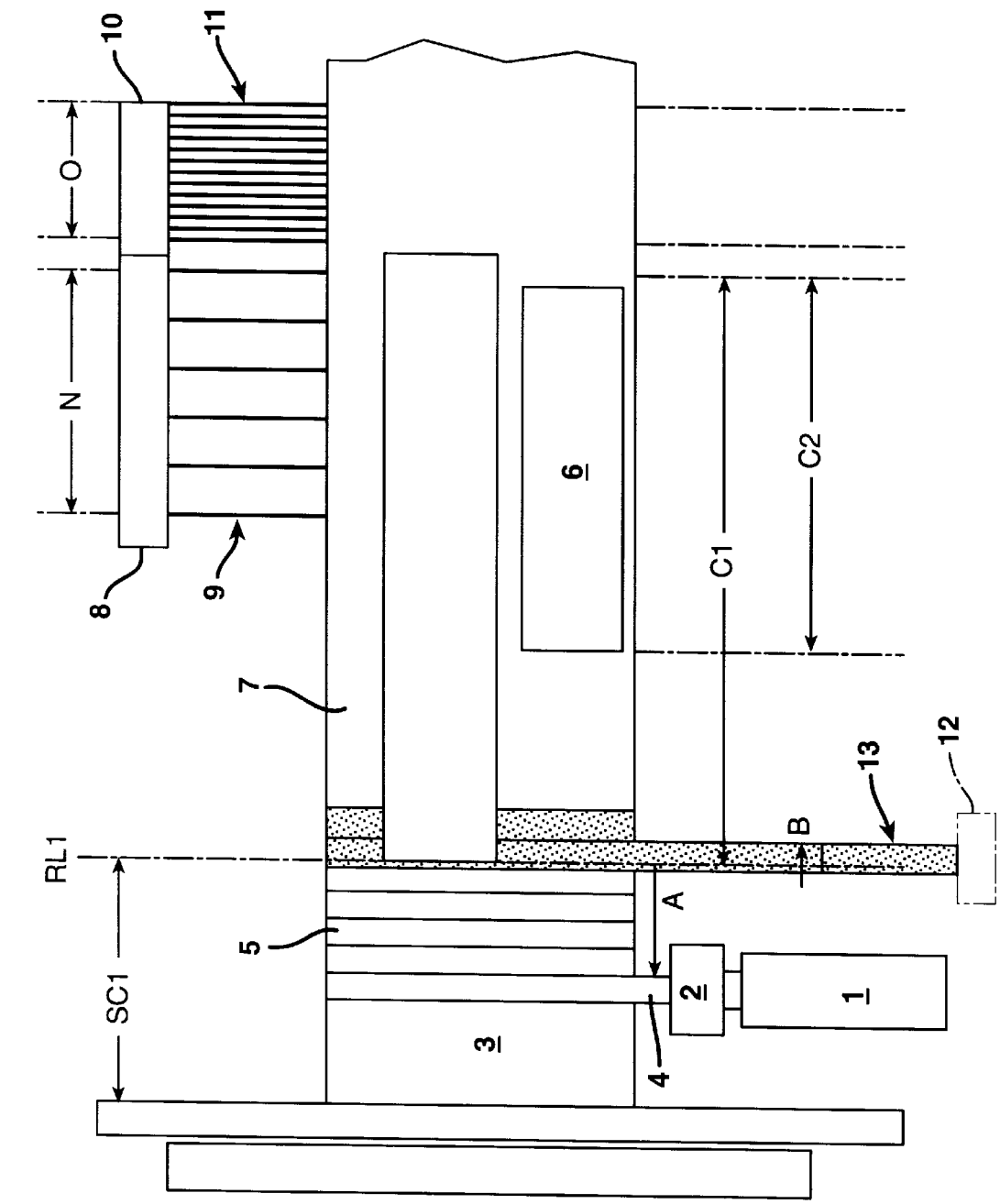
FIG. 1 is a process schematic demonstrating an embodiment of a process according to the present invention for the manufacture of the thermoplastic lined pipe.

In FIG. 1, a schematic representation of a first process for the manufacture of the thermoplastic liner pipe is illustrated. A first application means comprising a plasticating extruder (1) equipped with a film die (2) is positioned in close proximity to a continuous pipe making apparatus or Drostholm mandrel, previously described above (3), and a thin melt film of the desired thermoplastic (4) is extruded onto said mandrel to form an impermeable thermoplastic layer (5). In a preferred embodiment, the process may call for application of more than one thin film, e.g. two multi-layer films fabricated "in-line" by two extruders located adjacent to the mandrel and each other, such that the hot films are directly wound onto the mandrel in two or more layers simultaneously. The thickness of inner thermoplastic layer or layers are controlled by adjustment of the film dies. For example, a polyethylene film can be coextruded together with a terpolymer film made of PE/AE/MA (Polyethylene/Acrylic Ester/Maleic Anhydride) (such as, "Lotader"™, from Atochem), where the PE film can be from a few hundredths of a millimeter to a few tenths, and the terpolymer film can be as thin as a few hundredths of a millimeter. This terpolymer film may then be used as an additional bonding interface between the PE film and the reinforced polyester shell. The bonding reaction occurs at temperatures between 100° C. and 180° C., together with the cure reaction of the reinforced thermoset polyester shell. In a further embodiment, the inner liner is constructed from a combination of terpolymer films comprising a multi-layer coextruded film with a polyvinyl dichloride (PVDC) film.

In yet another embodiment, the inner liner is constructed from a combination of terpolymer films comprising a multi-layer coextruded film with a polypropylene (PP) based layer on the inner surface of the pipe facing the water and a polyamide (PA) based layer on the surface of the pipe facing the reinforced polyester side. This arrangement is designed to prevent styrene diffusion. Furthermore, very thin bonding layers of terpolymer (PE/AE/MA) as described above are coextruded between the PP and PA (also coextruded) layers, and between the PA and the reinforced polyester shell as well. Good bonding will be achieved, even after immersion and aging in warm water (60° C.) for 100 hours. The advantage of such solution is that PP is totally inert to water and has low water diffusion characteristics, thus preventing water from migrating into the GRP shell. The PA has low styrene diffusion characteristics, thus preventing any possible residual styrene from migrating from the GRP shell into the potable water.

In subsequent steps, the various layers of the GRP thermoset pipe are deposited in standard fashion. The thermoset resin can be cured by a variety of peroxide catalysts known in the art which contain compounds such as acetylacetone peroxide (AAP) or methyl ethyl ketone peroxide (MEKP). For example, Trigonox 40K® (Akzo Nobel Chemicals Inc.) is commonly used in curing thermoset resins.

In a preferred embodiment, the thermoset resin is cured with a peroxide blend composition that comprises a mixture of 30% AAP to 10% tert-butyl peroxybenzoate (a high-temperature catalyst). The novel mixture cures GRP pipe rapidly and thoroughly at lower temperatures than the standard MEKP curing process which results in the presence of lower residual styrene. As used herein, the term "peroxide blend composition" refers to a blend of AAP in an amount of from about 30 to about 35 percent of the total composition and a high temperature peroxide. AAP can be used as a pure product or in commercially available products. Generally, the commercially available products containing AAP also possess other diluents. Thus, the amount of AAP used in the composition of the present invention should be based upon the actual amount of AAP present in the commercially available product. For example, suitable AAP products include Akzo Trigonox 40, Akzo Trigonoz 44B, Elf Atochem Lupersol 224, and Peroxid-Chemie AAP-NA-2. The formulations for Akzo Trigonox 40, Akzo Trigonox 44B, and Elf Atochem Lupersol 224 are provided in Table 1.

TABLE 1

Formulations of Commercially Available AAP Products

| Ingredients | Akzo Trigonox 40 used in U.S. | Akzo Trigonox 44B used in Europe | Elf Atochem Lupersol 224 | Akzo Trigonox 40K |
|---|---|---|---|---|
| Acetylacetone peroxide | 34 | 33 | 34 | 24.0 |
| 2,4-pentanedione | — | — | 2 | — |
| t-butyl peroxybenzoate | — | — | — | 10.0 |
| Dimethylphthalate | 16 | — | — | 34.0 |
| n-methyl-2-pyrrolidone | — | — | 14 | — |
| Diacetone alcohol | 33 | 50 | 31 | 24.0 |
| Hydrogen peroxide | 3 | 7 | — | 2.0 |
| Diethylene glycol | 8 | 12 | 8 | 6.0 |
| Water | 6 | 5 | 10 | — |
| Acetic acid | — | — | 1 | — |
| Total | 100 | 100 | 100 | 100 |

As used herein, the term "high temperature peroxide" refers to peroxyesters, which reduce the residual styrene content of polyester resins in various molding applications. Suitable high temperature peroxides include, but are not limited to, t-butyl peroxybenzoate, 2,5-dimethyl-2,5-di(2-ethyl hexanoyl peroxy) hexane, t-butyl peroxy-2-ethyl hexanoate, t-butyl peroxy-3,5,5-trimethyl hexanoate, t-butyl peroxy isopropyl carbonate, and t-amyl peroxy (2-ethylhexyl) carbonate, for example. Each of these compounds are commercially available. In a preferred embodiment, the high temperature peroxide is t-butyl peroxybenzoate (TBPB), which is present in the composition in an amount of from about 5 to about 10 percent of the total composition. In a particularly preferred embodiment, TBPB is present in an amount of 10 percent of the total peroxide blend composition.

The effective amount of the high temperature peroxide to be used in the peroxide blend composition of the present invention is that amount, which in combination with the from about 30 to about 35 percent AAP, is effective in obtaining a cured resin having a low residual styrene content. In a preferred embodiment, the amount of high temperature peroxide suitable for other molding applications is one which reduces residual styrene levels and improves thermal and mechanical properties while minimizing the amount of extractable high temperature peroxide products therefrom and will guarantee a rapid and full cure at a temperature under about 150° C. Prior to this invention, residual styrene contents could be obtained in an amount of 1.5 to about 2.0 percent. However, a "low residual styrene content" as used herein refers preferably to an amount of less than about 1 percent residual styrene content. Since the residual styrene content may differ between different methods of manufacture, i.e., different molding applications, the residual styrene content as used herein refers to the resin obtained by the filament winding process. In addition, the residual styrene content not only differs between different methods of manufacture, but also with the curing conditions that may be used in combination with the process. In the present invention, an adequate combination of induction heating (to heat up the mandrel) and infrared heating to heat up the reinforced polyester is used (100°–150° C., preferably 140° C.). The residual styrene content of the cured resin may be measured by known methods such as by a combination of acetone extraction and gas chromatography.

The number and construction of the plastic layers of the GRP pipe with thermoplastic liner is dependent on the properties desired. In one embodiment, FIG. 1 shows the thermoset plastic resin of the pipe shell deposited directly over the forming inner thermoplastic layer on the mandrel by a second application means (6). A chopped glass fiber application means is positioned above the mandrel axially and into this chopping means are fed a plurality of glass fiber strands via a series of ports (7). The strands are chopped and fragments of a certain length are then deposited onto the forming thermoset plastic resin of the pipe shell. Proximal to the chopping means is a first spooling means (8) which feeds strands of polyester type yarn (9) circumferentially over the deposited fiber fragments to further compress them into the curing thermoset resin. Further along the mandrel and adjacent to the spooling means is a second spooling means (10) which feeds strands of fiberglass reinforcing filaments (11) circumferentially over the curing thermoset resin. Therefore the thermoset polyester resin, the glass fiber reinforcement and the filler are fed along the mandrel to build up the structural pipe shell in a continuous process. After cure by appropriate means (combination of induction and infrared heating), the continuous pipe, self-supporting, exits the mandrel and is cut to desired length.

Figure 2:
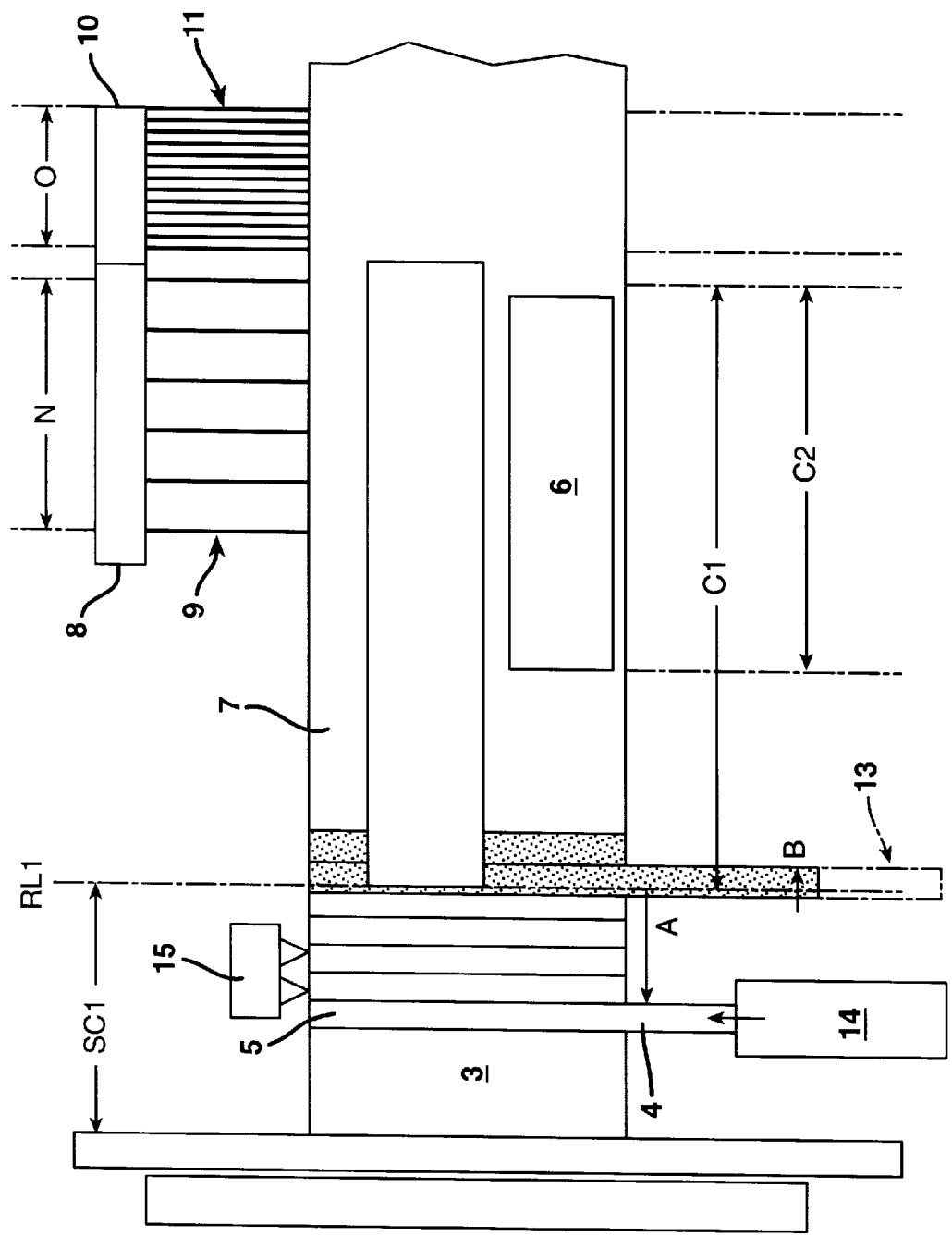
FIG. 2 represents an alternate process according to the invention for the manufacture of the thermoplastic lined pipe.

In an alternate embodiment, both FIGS. 1 and 2 illustrate a third application means (13) located adjacent and proximal to the plastic extruder (1) which feeds a surface mat type material used for enhancing adhesion and bonding between the inner thermoplastic layer and the outer thermoset resin shell.

In FIG. 2, a schematic representation of another preferred embodiment of a process of the invention is illustrated. The overall process is essentially the same as described for FIG. 1, except that instead of the first application means for extruding a thin melt film or films (10 μm–300 μm totaling less than 1 mm in total thickness) of the desired thermoplastics onto said mandrel to form an impermeable thermoplastic layer as in FIG. 1, the first application means feeds one or more thin pre-formed films of thermoplastics (14) onto the continuous mandrel (3), which are then welded into place using a hot air jet or hot metal pin or similar device (15). In a preferred embodiment, the process calls for application of more than 1 thin film, such as 2 multi-layer films, obtained from coextrusion which are prefabricated and wound "cold" onto the mandrel. The subsequent process of forming the thermoplastic liner pipe is identical to the description in FIG. 1. An advantage of this process is that it allows the manufacture of the pipe without the use of a plastic extruder or film die resulting in a lower capital expenditure at start-up, and less time needed to modify extrusion conditions. A manufacturer may simply purchase the film of the desired composition and thickness and feed it into the process, simplifying it.

Similarly, in yet another embodiment, the inner liner is constructed from a combination of TP films comprising a multi-layer coextruded film with a PP based layer on the inner surface of the pipe facing the water and a PA based layer on the surface of the pipe facing the reinforced polyester side, in order to prevent styrene diffusion. Furthermore, very thin bonding layers of terpolymer (PE/AE/MA) as described above are wound between the PP and PA (also coextruded) layers, and between the PA and the reinforced polyester shell as well.

In another alternate embodiment, the inner thermoplastic layer or layers are comprised of polyphenylene (PPE) polymers and their blends with polystyrene (PS) as the materials of choice. More specifically, the alternate embodiment comprises an inner thermoplastic layer of modified PPE resins such as polyphenylene oxide (PPO®) and NORYL® from General Electric Plastics, and have a thickness of less than 1 mm. In the preferred embodiment, a polyethylene film can be coextruded together with a terpolymer film made of PE/AE/MA as described in FIG. 1 above.

In yet another alternate embodiment, the inner thermoplastic layer or layers are comprised of PP or PE film, and coextruded such that the thermoplastic layer facing the pipe shell is comprised of a high molecular weight styrene-butadiene rubber (SBDR) or with ethylene-vinyl acetate copolymer (EVA), and can be coextruded together as described in FIG. 1 above.

The aforementioned thermoplastic resins exhibit excellent hydrolytic stability and water barrier properties and are also highly compatible with the polyester thermoset resins used in the outer layer of this process, because of the high styrene content in the thermoset resins. These properties allow excellent interfacial adhesion between the thermoplastic inner layer and the thermoset pipe shell, which eliminates the need for adhesion promoters (shown as 13 in FIGS. 1 and 2) used in other thermoplastics of the olefin or vinyl chloride families (PP, PVC, etc.). Furthermore, the thermoplastic resin combinations described above allow manufacture of GRP piping with thermoplastic liners having a thickness in the range of a few tens of microns to about 1 millimeter with averages in the range of 50 microns to 300 microns.

The thermoplastic liner pipe manufactured in this process exhibits low water permeability, good compatibility with potable water, elevated temperature resistance, low reactivity to heated water, flexibility throughout its service lifetime and an attractive performance ratio.

We claim:

1. A process foe continuously producing a glass-reinforced plastic potable water pipe with an ultra-thin thermoplastic inner layer and thermoset plastic outer shell, comprising the steps of:

conveying, in a semi-molten or softened forms at least one thin film of thermoplastic material, onto a mandrel circumferentially and axially to the mandrel by a first application means to form an inner layer less than 1 mm thick comprising a coextruded multi-layer thermoplastic film comprising a polyethylene film together with a terpolymer film;

contemporaneous with the application of said inner layer, applying a glass-reinforced thermoset plastic resin suitable for use as pipe shell laminate directly over the advancing inner layer circumferentially and axially to the mandrel and further along the mandrel, a second application means, thereby forming an outer layer which adheres to said inner layer;

said outer and inner layer forming a completed pipe; and curing the completed pipe as it is moved axially along the mandrel.

2. The process of claim 1, wherein the first application means comprises:

one or more extrusion means equipped with a film die means positioned in close proximity to said continuous mandrel surface and from which thin melt films of said thermoplastic material, less than 1 mm thick, are extruded onto said mandrel to form an essentially impermeable thermoplastic inner layer.

3. The process of claim 1, wherein the first application means comprises:

one or more conveyance means which can feed one or more pre-formed films of said thermoplastic materials, less than 1 mm thick, onto said mandrel to form an impermeable thermoplastic layer, and heating means to weld said films into place.

4. The process of claim 1, wherein said inner thermoplastic layer is further comprised of polyphenylene polymers.

5. The process of claim 1, wherein said inner thermoplastic layer is further comprised of polyphenylene polymers blended with polystyrene.

6. The process of claim 1, wherein said inner thermoplastic layer is further comprised of modified polyphenylene resins.

7. The process of claim 1, wherein said inner thermoplastic layer is comprised of coextruded multi-layer films, and wherein the combined thickness of all the coextruded films total a thickness of less than about 1 mm.

8. A process for continuously producing a glass-reinforced plastic potable watery pipe with an ultra-thin thermoplastic inner layer and thermoset plastic outer shell, comprising the steps of:

conveying, in a semi-molten or softened form, at least one thin film of thermoplastic material, onto a mandrel circumferentially and axially to the mandrel by a first application means to form an inner layer less than 1 mm thick comprising a coextruded multi-layer thermoplastic film comprising a polyethylene film together with a terpolymer film comprising polyethylene, an acrylic ester, and maleic anhydride;

contemporaneous with the application of said inner layer, applying a glass-reinforced thermoset plastic resin suitable for use as pipe shell laminate directly over the advancing inner layer circumferentially and axially to the mandrel and further along the mandrel, by a second application means, thereby forming an outer layer which adheres to said inner layer;

said outer and inner layer forming a completed pipe; and curing the completed pipe as it is moved axially along the mandrel.

9. A process for continuously producing a glass-reinforced plastic potable water pipe with an ultra-thin thermoplastic inner layer and thermoset plastic outer shell, comprising the steps of:

conveying, in a semi-molten or softened form, at least one thin film of thermoplastic material, onto a mandrel circumferentially and axially to the mandrel by a first application means to form an inner layer less than 1 mm thick;

contemporaneous with the application of said inner layer, applying a glass-reinforced thermoset polyester resin suitable for use as pipe shell laminate directly over the advancing inner layer circumferentially and axially to the mandrel and further along the mandrel, by a second application means, thereby forming an outer layer which adheres to said inner layer;

said inner layer comprising a coextruded multi-layer thermoplastic film comprising a polypropylene based film as the innermost layer, a polyamide based film, and having a very thin layer of terpolymer between the polypropylene based film and the polyamide based film, and a very thin layer of terpolymer between the polyamide based film and the outer layer;

said outer and inner layer forming a completed pipe; and curing the completed pipe as it is moved axially along the mandrel.

10. The process of claim 9, wherein said very thin layer of terpolymer comprises polyethylene, acrylic ester and maleic anhydride.

11. The process of claim 9, wherein said very thin layer of terpolymer comprises polyvinyl dichloride.

12. The process of claim 1, wherein said outer layer is comprised of polyester thermoset resin and glass fiber reinforcement in combination with a filler material.

13. The process of claim 12, wherein said filler material comprises at least one of: sand and/or calcium carbonate.

14. The process of claim 1, wherein said outer layer is cured with a composition comprising acetylacetone peroxide and t-butyl peroxy benzoate in a ratio of from about 30:10 to about 35:5, respectively.

15. The process of claim 1, wherein said outer layer is cured by a combination of heating of said mandrel and infrared heating of the outer resin so that the temperature of the resin is in the range of 100–180° C.

16. The process of claim 2, wherein said inner thermoplastic layer is further comprised of polyphenylene polymers.

17. The process of claim 2, wherein said inner thermoplastic layer is further comprised of polyphenylene polymers blended with polystyrene.

18. The process of claim 2, wherein said inner thermoplastic layer is further comprised of modified polyphenylene resins.

19. A process for continuously producing a glass-reinforced plastic potable water pipe with an ultra-thin thermoplastic inner layer and thermoset plastic outer shell, comprising steps of:

conveying, in a semi-molten or softened form, at least one thin film of thermoplastic material, onto a mandrel circumferentially and axially to the mandrel by a first application means to form an inner layer less than 1 mm thick, the first application means comprising one or more extrusion means equipped with a film die means positioned in close proximity to said mandrel surface and from which thin melt films of said thermoplastic material, less than 1 mm thick, are extruded onto said mandrel to form an essentially impermeable thermoplastic inner layer, said inner thermoplastic layer comprising a coextruded multi-layer thermoplastic film comprising a polyethylene film together with a terpolymer film;

contemporaneous with the application of said inner layer, applying glass-reinforced thermoset plastic resin suitable for use as pipe shell laminate directly over the advancing inner layer circumferentially and axially to the mandrel and further along the mandrel, by a second application means, thereby forming an outer layer which adheres to said inner layer;

said outer and inner layer forming a completed pipe; and curing the completed pipe as it is moved axially along the mandrel.

20. The process of claim 2, wherein said inner thermoplastic layer is comprised of coextruded multi-layer films, and wherein the combined thickness of all the coextruded films total a thickness of less than about 1 mm.

21. A process for continuously producing a glass-reinforced plastic potable water pipe with an ultra-thin thermoplastic inner layer and thermoset plastic outer shell, comprising the steps of:

conveying, in a semi-molten or softened form, at least one thin film of thermoplastic material, onto a mandrel circumferential and axially to the mandrel by a first application means to form an inner layer less than 1 mm thick, the first application means comprising one or more extrusion means equipped with a film die means positioned in close proximity to said mandrel surface and from which thin melt films of said thermoplastic material, less than 1 mm thick, are extruded onto said mandrel to form an essentially impermeable thermoplastic inner layer, said inner thermoplastic layer comprising a coextruded multi-layer thermoplastic film comprising a polyethylene film together with a terpolymer film comprising polyethylene, an acrylic ester, and maleic anhydride;

contemporaneous with the application of said inner layer, applying a glass-reinforced thermoset plastic resin suitable for use as pipe shell laminate directly over the advancing inner layer circumferentially and axially to the mandrel and further along the mandrel, by a second application means, thereby forming an outer layer which adheres to said inner layer;

said outer and inner layer forming a completed pipe; and curing the completed as it is moved axially along the mandrel.

22. A process for continuously producing a glass-reinforced plastic potable water pipe with an ultra-thin thermoplastic inner layer and thermoset plastic outer shell, comprising the steps of:

conveying, in a semi-molten or softened form, at least one thin film of thermoplastic material, onto a mandrel circumferentially and axially to the mandrel by a first application means to form an inner layer less than 1 mm thick, the first application means comprising one or more extrusion means equipped with a film die means positioned in close proximity to said mandrel surface and from which thin melt films of said thermoplastic material, less than 1 mm thick, are extruded onto said mandrel to form an essentially impermeable thermoplastic inner layer, said inner thermoplastic layer comprising a coextruded multi-layer thermoplastic film comprising a polypropylene based film as the innermost layer, a polyamide based film, and having a very thin layer of terpolymer between the polypropylene based film and the polyamide based film, and a very thin layer of terpolymer between the polyamide based film and the outer shell comprised of a coextruded multi-layer thermoplastic film comprising a polyethylene film together with said terpolymer film comprising polyethylene, an acrylic ester, and maleic anhydride;

contemporaneous with the application of said inner layer, applying a glass-reinforced thermoset plastic resin suitable for use as pipe shell laminate directly over the advancing inner layer circumferentially and axially to the mandrel and further along the mandrel, by a second application means, thereby forming an outer layer which adheres to said inner layer;

said outer and inner layer forming a completed pipe; and curing the completed pipe as it is moved axially along the mandrel.

23. The process of claim 22, wherein said very thin layer of terpolymer comprises polyethylene, acrylic ester and maleic anhydride.

24. The process of claim 22, wherein said thin layer of terpolymer comprises polyvinyl dichloride.

25. The process of claim 2, wherein said outer layer is comprised of polyester thermoset resin and glass fiber reinforcement in combination with a filler material.

26. The process of claim 25, wherein said filler material comprises at least one of: sand and/or calcium carbonate.

27. The process of claim 2, wherein said outer layer is cured with a composition comprising acetylacetone peroxide and t-butyl peroxy benzoate in a ratio of from about 30:10 to about 35:5, respectively.

28. The process of claim 2, wherein said outer layer is cured by a combination of inductive heating of said mandrel and infrared heating of the outer resin so that the temperature of resin is in the range of 100–110° C.

29. The process of claim 3, wherein said inner thermoplastic layer is comprised of polyphenylene polymers.

30. The process of claim 3, wherein said inner thermoplastic layer is comprised of polyphenylene polymers blended with polystyrene.

31. The process of claim 3, wherein said inner thermoplastic layer is comprised of modified polyphenylene resins.

32. The process of claim 3, wherein said inner thermoplastic layer is comprised of coextruded multi-layer films, and wherein the combined thickness of all the coextruded films total a thickness of less than about 1 mm.

33. A process for continuously producing a glass-reinforced plastic potable water pipe with an ultra-thin thermoplastic inner layer and thermoset plastic outer shell, comprising the steps of:

conveying in a semi-molten or softened form, at least one thin film of thermoplastic material, onto a mandrel circumferentially and axially to the mandrel by a first application means to form an inner layer less than 1 mm thick the first application means comprising one or more conveyance means which can feed one or more pre-formed films of said thermoplastic materials, less than 1 mm thick, onto said mandrel to form an impermeable thermoplastic layer, and heating means to weld said films into place, said inner thermoplastic layer comprising a coextruded multi-layer thermoplastic film comprising a polyethylene film together with a terpolymer film, contemporaneous with the application of said inner layer, applying a glass-reinforced thermoset plastic resin suitable for use as pipe shell laminate directly over the advancing inner layer circumferentially and axially to the mandrel and further along the mandrel, by a second application means, thereby forming an outer layer which adheres to said inner layer;

said outer and inner layer forming a completed pipe; and curing the completed pipe as it is moved axially along the mandrel.

34. A process for continuously producing glass-reinforced plastic potable water pipe with an ultra-thin thermoplastic inner layer and thermoset plastic outer shell, comprising the steps of:

conveying, in a semi-molten or softened form, at least one thin film of thermoplastic material, onto a mandrel circumferentially and axially to the mandrel by a first application means to form an inner layer less than 1 mm thick the first application means comprising one or more conveyance means which can feed one or more pre-formed films of said thermoplastic materials, less than 1 mm thick, onto said mandrel to form an impermeable thermoplastic layer, and heating means to weld said films into place, said inner thermoplastic layer comprising a coextruded multi-layer thermoplastic film comprising a polyethylene film together with a terpolymer film comprising polyethylene, an acrylic ester, and maleic anhydride;

contemporaneous with the application of said inner layer, applying a glass-reinforced thermoset plastic resin suitable for use as pipe shell laminate directly over the advancing inner layer circumferentially and axially to the mandrel and further along the mandrel, by a second application means, thereby forming an outer layer which adheres to said inner layer;

said outer and inner layer forming a completed pipe; and curing the completed pipe as it is moved axially along the mandrel.

35. A process for continuously producing a glass-reinforced plastic potable water pipe with an ultra-thin thermoplastic inner layer and thermoset plastic outer shell, comprising the steps of:

conveying, in a semi-molten or softened form, at least one thin film of thermoplastic material, onto a mandrel circumferentially and axially to the mandrel by a first application means to form an inner layer less than 1 mm thick the first application means comprising one or more conveyance means which can feed one or more pre-formed films of said thermoplastic materials, less than 1 mm thick, onto said mandrel to form an impermeable thermoplastic layer, and heating means to weld said films into place, said inner thermoplastic layer comprising a coextruded multi-layer thermoplastic film comprising a polypropylene based film as the innermost layer, a polyamide based film, and having a very thin layer of terpolymer between the polypropylene based film and the polyamide based film and a very thin layer of terpolymer between the polyamide based film and the outer layer;

contemporaneous with the application of said inner layer, applying a glass-reinforced thermoset plastic resin suitable for use as pipe shell laminate directly over the advancing inner layer circumferentially and axially to the mandrel and further along the mandrel, by a second application means, thereby forming an outer layer which adheres to said inner layer;

said outer and inner layer forming a completed pipe; and curing the completed pipe as it is moved axially along the mandrel.

36. The process of claim 35, wherein said very thin layer of terpolymer comprises polyethylene, acrylic ester and maleic anhydride.

37. The process of claim 35, wherein said very thin layer of terpolymer comprises polyvinyl dichloride.

38. The process of claim 3, wherein said outer layer is comprised of polyester thermoset resin and glass fiber reinforcement in combination with a filler material.

39. The process of claim 38, wherein said filler material comprises either or both of: sand and calcium carbonate.

40. The process of claim 3, wherein said outer layer is cured by a combination of inductive heating of said mandrel and infrared heating of the outer resin so that the temperature of resin is in the range of 100–180° C.

41. The process of claim 3, wherein said outer layer is cured with a composition comprising acetylacetone peroxide and t-butyl peroxy benzoate in a ratio of from about 30:10 to about 35:5, respectively.

* * * * *